Sept. 4, 1951     S. BLOOMFIELD     2,566,593
SLIP-ON NUT
Filed June 8, 1945
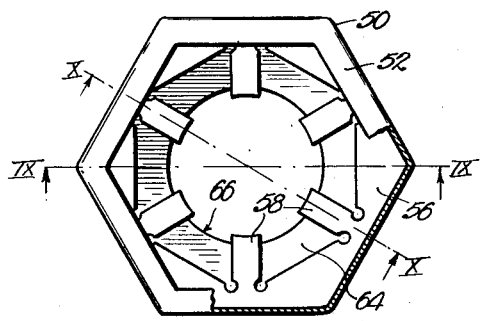
Fig. 1.
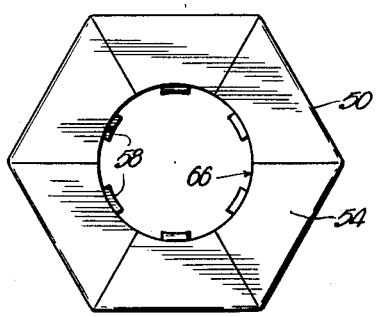
Fig. 2.
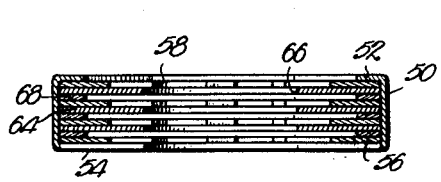
Fig. 3.
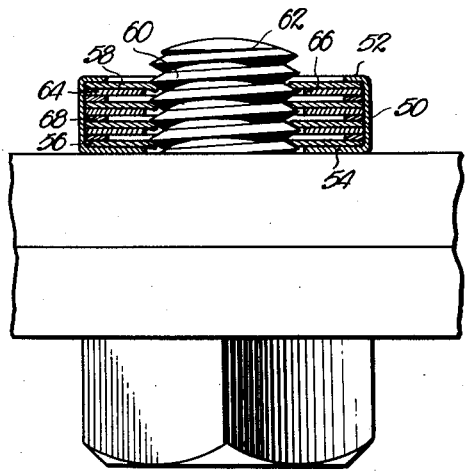
Fig. 4.
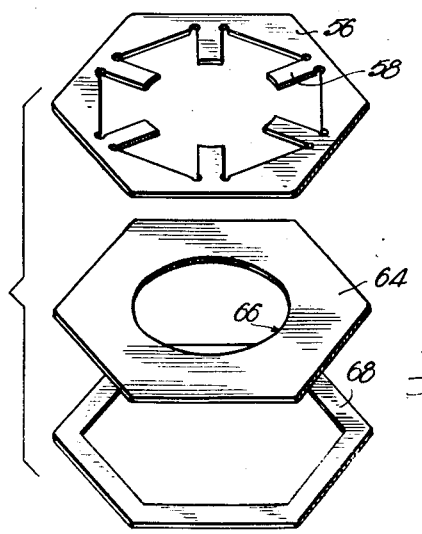
Fig. 5.
INVENTOR.
Samuel Bloomfield
BY 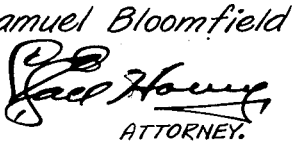
ATTORNEY.

Patented Sept. 4, 1951

2,566,593

UNITED STATES PATENT OFFICE 2,566,593

SLIP-ON NUT

Samuel Bloomfield, Wichita, Kans., assignor to C. Earl Hovey, Kansas City, Mo., as trustee Application June 8, 1945, Serial No. 598,215

1 Claim. (Cl. 85—36)

This invention relates to nuts applicable to threaded bolts and has as a primary aim to provide a nut capable of moving longitudinally onto a threaded bolt to a point of securement without the necessity of turning the nut about its axis.

One of the primary aims of the invention is the provision of a nut for threaded bolts of the character commonly called "slip-on nuts" which has as a salient feature thereof a number of radially disposed tongues each of which is flexible and movable to a position within the threads of the receiving bolt as the nut is moved longitudinally thereof.

Further aims of the invention include the provision of a slip-on nut, the tongues of which are each provided with a support or a transverse fulcrum near the free ends thereof and means for supporting the several tongues at a point remote from the fulcrum and at a distance farther from the receiving bolt than the fulcrum whereby when the nut is slid to position in one direction, the tongues may flex to a greater degree than when effort is made to slide the nut in the opposite direction.

A yet further object of this invention is to provide a slip-on nut that may be made entirely of sheet material; that is therefore, inexpensive to manufacture; that is novel in its construction because of the manner in which the series of bolt thread engaging tongues are disposed; that is equipped with tongues having greater flexibility in one direction than in the other; that may be finally tightened after moving to position against the work longitudinally along the threaded bolt, and that establishes a sufficient amount of friction between the series of tongues thereof and the threads of the bolt to preclude accidental displacement.

Other objects of the invention will appear during the course of the following specification referring to the accompanying drawings, wherein:

Fig. 1 is a top plan of a slip-on nut made to embody the present invention.

Fig. 2 is an inverted plan view of the nut shown in Fig. 1.

Fig. 3 is a sectional view taken on line IX—IX of Fig. 1.

Fig. 4 is a similar cross sectional view taken on line X—X of Fig. 1 but showing the nut in place on a bolt, and Fig. 5 is a perspective stretch-out view illustrating certain of the component parts of the slip-on nut illustrated in Figs. 1 to 4 inclusive.

In the form of the invention illustrated in the drawing, a body 50 of the nut is channel-shape in transverse cross section and carries within the confines of its inturned flanges 52 and 54, a number of rims 56 each of which has radially inwardly directed tongues 58. It is these tongues that serve to engage the threads 60 of the bolt 62 upon which this multiple type nut is pressed. A support 64 immediately underlies each rim 56 to present a fulcrum edge 66 spaced inwardly from the free ends of the tongues 58. A spacer 68 lies between each rim 56 and the over-lying support 64, as clearly shown in Figs. 3 and 4, to provide space for tongues 58 to enter as the nut is forced downwardly onto bolt 62. Several of rims 56 are employed in body 50 and the tongues 58 will assume the positions shown in Fig. 5 when the device is in place.

Having thus described the invention, what is claimed as new and desired to be secured by Letters Patent is:

A slip-on nut for bolts having a threaded shank, said nut comprising a tubular body having a side wall provided with a plurality of faces, a first inturned flange at one end thereof defining a central, circular opening having a diameter slightly greater than the diameter of said threaded shank, and a second inturned flange at the opposite end thereof defining a polygonal opening appreciably greater than said diameter of the threaded shank and having an edge corresponding to each face respectively of said side wall; and a plurality of sets of washer-like members in the body, filling the space between said flanges, and having the peripheries thereof conforming to and engaging said faces of the side wall, each set comprising a resilient member having an opening and a plurality of opposed pairs of elongated tongues extending radially inwardly within said opening thereof, and defining an imaginary circle at the innermost ends thereof having a lesser diameter than that of said threaded shank, a second member underlying said resilient member and provided with a circular opening coaxial with the opening of said first flange and identical therewith in diameter, and a third member underlying the second member and identical in form with said second flange, said tongues each being cut away at opposite edges adjacent their outermost ends whereby to enhance the flexibility thereof.

SAMUEL BLOOMFIELD.

(References on following page)

REFERENCES CITED

The following references are of record in the file of this patent:

UNITED STATES PATENTS

| Number | Name | Date |
|---|---|---|
| 621,456 | Jamieson | Mar. 21, 1899 |
| 870,820 | Ellis | Nov. 12, 1907 |
| 1,161,317 | Kielland | Nov. 23, 1915 |
| 1,318,082 | Jacoby | Oct. 7, 1919 |
| 1,523,116 | Goodwin | Jan. 13, 1925 |
| 1,703,960 | Romig | Mar. 5, 1929 |
| 1,791,017 | Sundh | Feb. 3, 1931 |
| 2,055,166 | Berry | Sept. 22, 1936 |
| 2,238,664 | Tinnerman | Apr. 15, 1941 |
| 2,342,690 | Place | Feb. 29, 1944 |

FOREIGN PATENTS

| Number | Country | Date |
|---|---|---|
| 270,996 | Germany | Mar. 6, 1914 |
| 425,881 | Germany | Feb. 27, 1926 |